United States Patent
Huang et al.

(10) Patent No.: US 9,999,057 B2
(45) Date of Patent: Jun. 12, 2018

(54) RESOURCE ALLOCATION METHOD OF A WIRELESS COMMUNICATION SYSTEM AND MECHANISM THEREOF

(71) Applicant: HON HAI PRECISION INDUSTRY CO., LTD., New Taipei (TW)

(72) Inventors: Yan-Rung Huang, New Taipei (TW); Ya-Chun Chuang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/687,616

(22) Filed: Aug. 28, 2017

(65) Prior Publication Data

US 2018/0063847 A1   Mar. 1, 2018

Related U.S. Application Data

(60) Provisional application No. 62/382,359, filed on Sep. 1, 2016.

(51) Int. Cl.
*H04W 4/00* (2018.01)
*H04W 72/04* (2009.01)

(52) U.S. Cl.
CPC .............. *H04W 72/0493* (2013.01)

(58) Field of Classification Search
CPC .................................. H04W 72/0493
See application file for complete search history.

(56) References Cited

U.S. PATENT DOCUMENTS

| | | | |
|---|---|---|---|
| 2012/0155446 A1* | 6/2012 | Machida | H04W 52/0232 370/338 |
| 2014/0029431 A1* | 1/2014 | Haberland | H04W 88/08 370/235 |
| 2014/0233413 A1* | 8/2014 | Dahod | H04N 21/6131 370/252 |
| 2014/0378047 A1* | 12/2014 | Kennard | H04B 7/15535 455/22 |
| 2015/0256358 A1 | 9/2015 | Stapleton et al. | |
| 2015/0372728 A1* | 12/2015 | Rahman | H04B 7/0456 370/329 |
| 2016/0128085 A1* | 5/2016 | Liu | H04J 14/00 398/96 |
| 2016/0330736 A1* | 11/2016 | Polehn | H04W 72/0446 |
| 2017/0005736 A1* | 1/2017 | Gage | H04B 7/024 |
| 2017/0164215 A1* | 6/2017 | Chen | H04W 24/02 |
| 2017/0257823 A1* | 9/2017 | Ashwood-Smith | H04W 48/18 |

FOREIGN PATENT DOCUMENTS

EP  2512202 A1  10/2012
WO  2016/054183 A1  4/2016

* cited by examiner

*Primary Examiner* — Clemence Han
(74) *Attorney, Agent, or Firm* — ScienBiziP, P.C.

(57) ABSTRACT

An electronic equipment of a wireless communication system is provided. The electronic equipment includes an orchestrator respectively coupled to an FH network, an RRH pool, and a BBU pool. The orchestrator is configured to establish a data path in response to RRH allocation information, FH allocation information and BBU allocation information. The data path includes at least one RRH in the RRH pool, the FH network and at least one BBU in the BBU pool.

50 Claims, 10 Drawing Sheets

RESOURCE ALLOCATION METHOD OF A WIRELESS COMMUNICATION SYSTEM AND MECHANISM THEREOF

CROSS REFERENCE

This application claims the benefit of U.S. Provisional Application Ser. No. 62/382,359, filed on Sep. 1, 2016, and entitled "COMMUNICATION SYSTEM HAVING WIRELESS TRANSCEIVER RESOURCES ALLOCATION MECHANISM AND METHOD THEREOF", which is incorporated herein by reference in its entirety.

TECHNICAL FIELD

The present disclosure relates generally to the field of wireless communication, and pertains particularly to a resource allocation method of a wireless communication system and mechanism thereof.

BACKGROUND

The use of mobile communications networks has increased over the last decade. Operators of the mobile communications networks have increased the number of base stations and/or base transceiver stations (BTS) in order to meet an increasing demand for services by users of the mobile communications networks. The operators of the mobile communications networks wish to reduce the costs associated with installing and operating base stations. This wish for cost reduction has led the network operators and manufacturers of network infrastructure to come up with new concepts for the network architecture.

SUMMARY

In one aspect of the present disclosure, a method of resource allocation implemented in a wireless communication system is provided. The method includes the following steps. At least one resource allocation instruction is received by an orchestrator. A remote radio head (RRH) resource allocation request, a fronthaul (FH) resource allocation request, and a baseband unit (BBU) resource allocation request are generated by the orchestrator, in response to the at least one resource allocation instruction. The RRH resource allocation request is transmitted, by the orchestrator, to an RRH pool, the FH resource allocation request is transmitted, by the orchestrator, to an FH network and the BBU resource allocation request is transmitted, by the orchestrator, to a BBU pool. An RRH resource is allocated by an RRH controller of the RRH pool in response to the RRH resource allocation request, and RRH allocation information of the allocated RRH resource is transmitted to the orchestrator. An FH network resource is allocated by an FH controller of the FH network in response to the FH resource allocation request, and FH allocation information of the allocated FH network resource is transmitted to the orchestrator. A BBU resource is allocated by a BBU controller of the BBU pool in response to the BBU resource allocation request, and BBU allocation information of the allocated BBU resource is transmitted to the orchestrator. A data path including at least one RRH in the RRH pool, the FH network and at least one BBU in the BBU pool is established by the orchestrator in response to the RRH allocation information, the FH allocation information and the BBU allocation information.

In another aspect of the present disclosure, a method of resource allocation implemented in an electronic equipment is provided. The method includes the following steps. At least one resource allocation instruction is received by an orchestrator. An RRH resource allocation request, an FH resource allocation request, and a BBU resource allocation request are generated by the orchestrator in response to the at least one resource allocation instruction. The RRH resource allocation request is transmitted, by the orchestrator, to an RRH pool, the FH resource allocation request is transmitted, by the orchestrator, to an FH network and the BBU resource allocation request is transmitted, by the orchestrator, to a BBU pool. RRH allocation information of an allocated RRH resource is received, by the orchestrator, from an RRH controller of the RRH pool. FH allocation information of an allocated FH network resource is received, by the orchestrator, from an FH controller of the FH network. BBU allocation information of an allocated BBU resource is received, by the orchestrator, from a BBU controller of the BBU pool. A data path including at least one RRH in the RRH pool, the FH network and at least one BBU in the BBU pool is established by the orchestrator in response to the RRH allocation information, the FH allocation information and the BBU allocation information.

In yet another aspect of the present disclosure, an electronic equipment of a wireless communication system is provided. The electronic equipment includes an orchestrator respectively coupled to an FH network, an RRH pool, and a BBU pool. The orchestrator is configured to establish a data path in response to RRH allocation information, FH allocation information and BBU allocation information. The data path includes at least one RRH in the RRH pool, the FH network and at least one BBU in the BBU pool.

In the other aspect of the present disclosure, a BBU resource allocation system is provided. The BBU resource allocation system includes a BBU controller and a plurality of BBUs. The BBUs coupled to the BBU controller. The BBU controller is configured to receive a BBU resource allocation request from an electronic equipment. The electronic equipment is respectively coupled to an FH network and an RRH pool. The BBU controller is further configured to allocate a BBU resource in response to the BBU resource allocation request, and transmit BBU allocation information to the electronic equipment in response to the allocated BBU resource.

BRIEF DESCRIPTION OF THE DRAWINGS

Implementations of the present technology will now be described, by way of example only, with reference to the attached figures, wherein.

DETAILED DESCRIPTION

Figure 1:
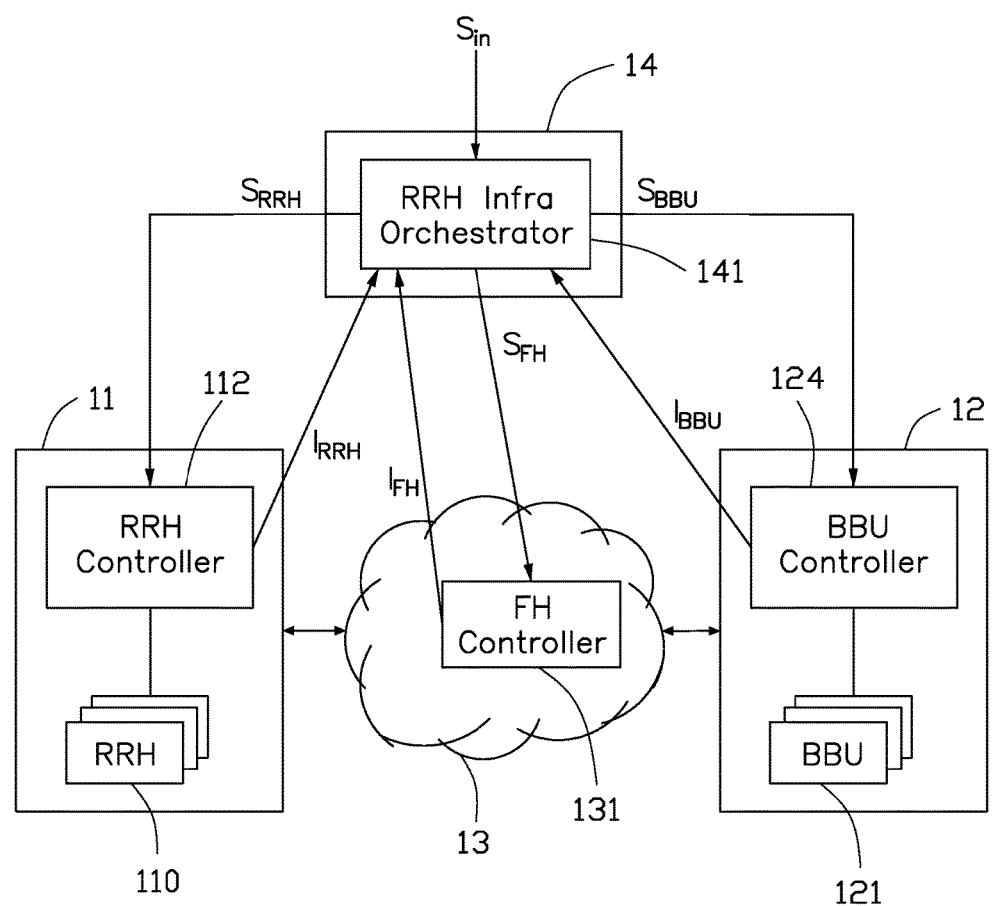
FIG. 1 is a block diagram of a wireless communication system, in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout the present disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a wireless communication system having resources allocation mechanism and method thereof.

FIG. 1 shows a wireless communication system 100, in accordance with one embodiment of the present disclosure. In present exemplary embodiment, the wireless communication system 100 includes an RRH pool 11, a BBU pool 12, and an electronic equipment 14. The electronic equipment 14 is configured to allocate resources of the wireless communication system 100. The RRH pool 11 is coupled to the BBU pool 12 through an FH network 13.

In the present exemplary embodiment, the RRH pool 11 includes a plurality of RRHs 110 respectively coupled to an RRH controller 112. The BBU pool 12 includes a plurality of BBUs 121 respectively coupled to a BBU controller 124. The FH network 13 includes an FH controller 131. The electronic equipment 14 includes an orchestrator 141 which is coupled to the FH network 13, the RRH pool 11, and the BBU pool 12. The orchestrator 141, in the present exemplary embodiment, is configured to generate, in response to at least one resource allocation instruction $S_{in}$, from a user equipment, an RRH resource allocation request $S_{RRH}$ to the RRH pool 11 to allocate an RRH resource of the RRH pool 11, an FH resource allocation request $S_{FH}$ to the FH network 13 to allocate a FH network resource of the FH network 13, and a BBU resource allocation request $S_{BBU}$ to the BBU pool 12 to allocate a BBU resource of the BBU pool 12.

The RRH controller 112, in the present exemplary embodiment, is configured to generate RRH allocation information $I_{RRH}$ in response to the allocated RRH resource. The FH controller 131 is configured to generate FH allocation information $I_{FH}$ in response to the allocated FH network resource. The BBU controller 124 is configured to generate BBU allocation information $I_{BBU}$ in response to the allocated BBU resource.

Figure 2:
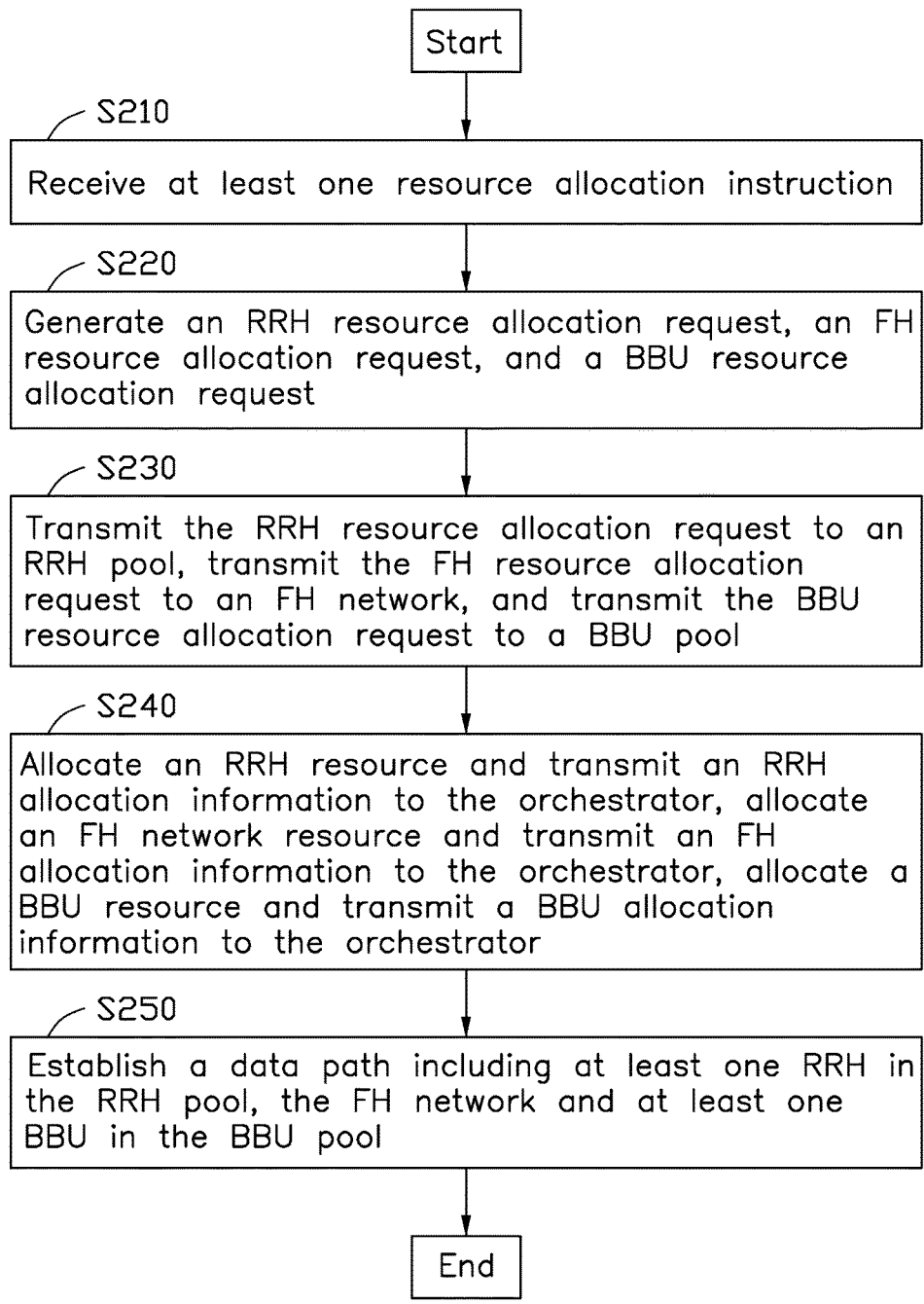
FIG. 2 is a flowchart of a method of resource allocation implemented in the wireless communication system of FIG. 1, in accordance with an exemplary embodiment of the present disclosure.

FIG. 2 shows a method of resource allocation implemented in the wireless communication system of FIG. 1 of the present disclosure. As shown in FIG. 2, in step S210, at least one resource allocation instruction $S_{in}$ is received by the orchestrator 141. In step S220, the RRH resource allocation request $S_{RRH}$, the FH resource allocation request $S_{FH}$, and the BBU resource allocation request $S_{BBU}$ are generated by the orchestrator 141 in response to the at least one resource allocation instruction $S_{in}$. In step S230, the RRH resource allocation request $S_{RRH}$ is transmitted, by the orchestrator 141, to the RRH pool 11, the FH resource allocation request $S_{FH}$ is transmitted, by the orchestrator 141, the FH network 13, and the BBU resource allocation request $S_{BBU}$ is transmitted, by the orchestrator 141, to the BBU pool 12.

After the RRH resource allocation request $S_{RRH}$ is received by the RRH controller 112, step S240 is then performed. In step S240, the RRH resource is allocated by the RRH controller 112 of the RRH pool 11 in response to the RRH resource allocation request $S_{RRH}$, and the RRH allocation information $I_{RRH}$ of the allocated RRH resource is transmitted to the orchestrator 141. Similarly, after the FH resource allocation request $S_{FH}$ is received by the FH controller 131, in step S240, the FH network resource is allocated by the FH controller 131 of the FH network 13 in response to the FH resource allocation request $S_{FH}$, and the FH allocation information $I_{FH}$ of the allocated FH network resource is transmitted to the orchestrator 141. Similarly, after the BBU resource allocation request $S_{BBU}$ is received by the BBU controller 124, in step S240, the BBU resource is allocated by the BBU controller 124 of the BBU pool 12 in response to the BBU resource allocation request $S_{BBU}$, and the BBU allocation information $I_{BBU}$ of the allocated BBU resource is transmitted to the orchestrator 141. In step S250, a data path including at least one RRH 110 in the RRH pool 11, the FH network 13 and at least one BBU 121 in the BBU pool 12 is established by the orchestrator 141 in response to the RRH allocation information $I_{RRH}$, the FH allocation information $I_{FH}$ and the BBU allocation information $I_{BBU}$.

Figure 3:
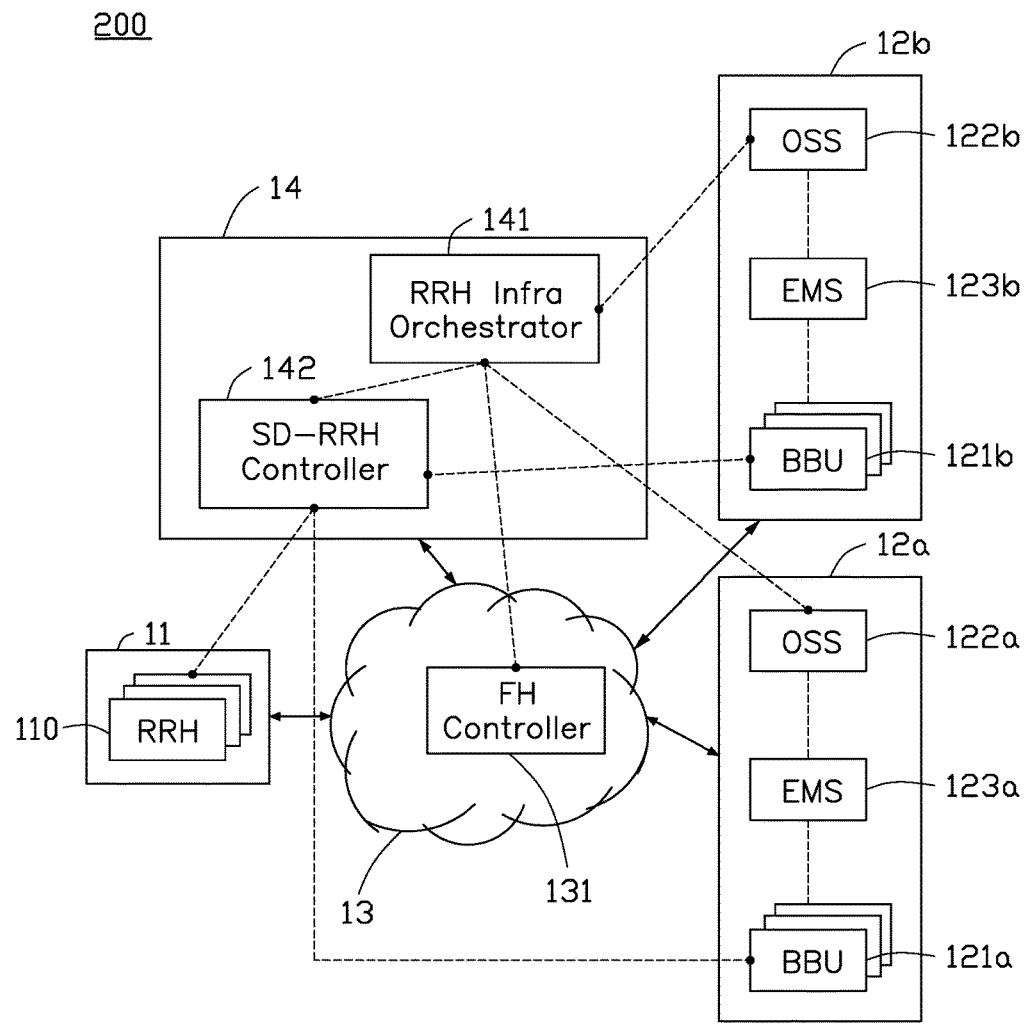
FIG. 3 is a block diagram of a wireless communication system architecture of a radio access network (RAN) having a Radio over Ethernet (RoE) control mechanism, in accordance with an exemplary embodiment of the present disclosure.

FIG. 3 illustrates a wireless communication system architecture of a radio access network having a radio over Ethernet (RoE) control mechanism of one embodiment of the present disclosure. In the present exemplary embodiment, the wireless communication system 200 of a radio access network (RAN) adopts an electronic equipment. As shown in FIG. 3, the solid connection lines indicate physical network connections (e.g. wired or wireless), while the dotted lines represent software interfaces and the corresponding hardware implementations thereof.

The wireless communication system 200, in the present exemplary embodiment, includes the RRH pool 11, a plurality of BBU pools 12a and 12b, and the electronic equipment 14. The BBU pools 12a and 12b are communicatively coupled to the electronic equipment 14 and the RRH pool 11 through the shared fronthaul network 13.

In the present exemplary embodiment, the RRH pool 11 and the electronic equipment 14 may be supported by an RRH network provider. The RRH pool 11, in the present exemplary embodiment, comprises a plurality of remote radio heads (e.g., RRHs 110), which may be physically and functionally identical remote radio transceiver units.

Each of the BBU pools 12a/12b includes a plurality of BBUs 121a/121b, an Operation Support System (OSS) 122a/122b, and an Element Management System (EMS) 123a/123b. The BBUs 121a/121b are controllably coupled to the respective EMS 123a/123b through connection that implement suitable software interfaces. Each of the EMS 123a/123b is controllably coupled to the respective OSS 122a/122b through suitable hardware and/or software interfaces.

In the present exemplary embodiment, each of the BBU pools 12a/12b is owned or operated by an individual mobile network operator (MNO), and concurrently share the infrastructures and resources of the RRH pool 11 through the implementation of the electronic equipment 14 and the SDN-equipped fronthaul network (e.g., FH controller 131). In the present exemplary embodiment, BBU pool 12a and BBU pool 12b are supported by the same mobile network operator. In some other embodiments, BBU pool 12a and BBU pool 12b are supported by different mobile network operators.

The shared fronthaul network 13, in the present exemplary embodiment, incorporates a software defined FH controller 131 which is capable of managing the fronthaul network resources. Each of the BBU pools 12a and 12b is coupled to the RRH pool 11 through the shared fronthaul network 13. Each of the BBU pools 12a and 12b is coupled to the shared fronthaul network 13. The RRH pool 11 includes physical network connections including wired links, wireless links, and a suitable combination thereof.

The electronic equipment 14 is connected to the shared fronthaul network 13. The electronic equipment 14 is further communicatively coupled to the BBU pools 12a and 12b and the RRH pool 11. Specifically, in the present exemplary embodiment, the electronic equipment 14 comprises an RRH infrastructure orchestrator 141 (hereinafter referred to as an orchestrator) and a software defined RRH (SD-RRH) controller 142.

The orchestrator 141 is communicatively coupled to the SD-RRH controller 142 through a software interface OCP-NBI (ORI C&M Protocol Northbound API). The orchestrator 141 is coupled to the OSSs 122a and 122b of the BBU pools 12a and 12b, respectively, through software interfaces EMS-NBIs (EMS Northbound API). The orchestrator 141, in the present exemplary embodiment, is coupled to the FH controller 131 through a software interface OF-NBI (OpenFlow Northbound API). The orchestrator 141 is configured to receive resource allocation instructions from a user equipment and generate resource allocation requests to the SD-RRH controller 142, FH controller 131, and the OSS 122a/122b accordingly.

In the present exemplary embodiment, the SD-RRH controller 142 is communicatively coupled to the RRH pool 11 and the BBUs 121a and 121b of the respective BBU pools 12a and 12b through software interfaces OCP-SBIs. Therefore, a software defined virtual RRH can be dynamically assigned to different BBUs of multiple individual BBU pools (e.g., operated by different Mobile Network Operators (MNOs)).

In the present exemplary embodiment, the software interface EMS-NBI (based on 3GPP or TM Forum model) includes communication interfaces which allow the OSS (e.g., 122a/122b) to communicate with the orchestrator 141. This software interface EMS-NBI enables the OSS (e.g., 122a/122b) to request the RRH infra network resources from the orchestrator 141.

The software interface OCP-NBI includes communication interfaces between the orchestrator 141 to the SD-RRH controller 142. The software interface OCP-NBI is communicatively linked to a northbound interface of the SD-RRH controller 142 and allows the orchestrator 141 to communicate with the SD-RRH controller 142.

The software interface OF-NBI includes communication interfaces which allow the orchestrator 141 to communicate with the FH controller 131. The software interface OF-NBI is communicatively linked to a communication interface of the FH controller 131 and allows the orchestrator 141 to communicate with the FH controller 131.

The software interface OCP-SBI includes communication interfaces between the SD-RRH controller 142 and the RRH pool 11. The software interface OCP-SBI enables the SD-RRH controller 142 to issue RRH configurations and setup resource allocation in the RRH pool 11.

The software interface OCP-SBI comprises communication interfaces between the SD-RRH controller 142 and the BBUs 121a and 121b of the respective BBU pools 12a and 12b. The software interface OCP-SBI enables the SD-RRH controller 142 to communicate with the BBUs for RRH C&M (Control & Management) executions through a southbound interface thereof.

Under this framework, the FH network 13 can be shared by different mobile network operators, which in turn enables dynamic sharing of RRH pool 11 between different BBU pools (e.g., BBU pools 12a and 12b). Accordingly, the present architecture in accordance with the present disclosure may achieve more flexible and cost-effective RAN sharing among different MNOs.

Figure 4:
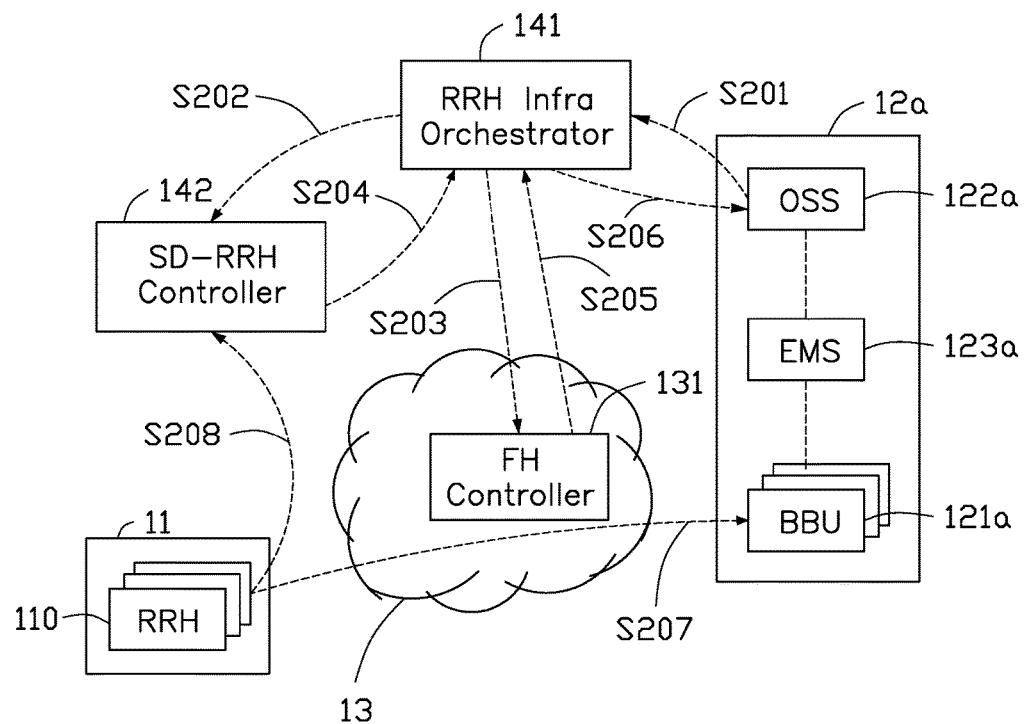
FIG. 4 is a schematic diagram of the wireless communication system of FIG. 3 employing a RoE control mechanism, in accordance with an exemplary embodiment of the present disclosure.

FIG. 4 is a schematic diagram of the wireless communication system architecture of FIG. 3 employing a Radio over Ethernet (RoE) mechanism, in accordance with an exemplary embodiment of the present disclosure. In the present exemplary embodiment, the orchestrator 141 is configured to receive a resource allocation request from the OSS 122a. As shown in FIG. 4, in step S201, when an OSS/BBU requires FH network and RRH resources, a request of FH and RRH resources allocation is transmitted to the RRH infrastructure orchestrator 141 from the OSS 122a of the BBU pool 12a. In step S202, the request is converted to RRH specific parameters, by the RRH infrastructure orchestrator 141, and then transmitted to the SD-RRH controller 142 for allocating SD-RRH resources for BBU. Moreover, in step S203, the request is converted to FH specific parameters to the FH controller 131 for allocating FH network resources for BBU.

Afterwards, in step S204, the RRH allocation information is transmitted by the SD-RRH controller 142 to the RRH infrastructure orchestrator 141. In step S205, the FH allocation information is transmitted by the FH controller 131 to the RRH infrastructure orchestrator 141. After the FH and RRH allocation information is obtained by the RRH infrastructure orchestrator 141, the FH and RRH allocation information are sent to OSS 122a of the BBU pool 12a in step S206. In step S207, a data path including the allocated FH network, RRHs and OSS/BBU is then established. In the present exemplary embodiment, the data path is established based on the line rate, and compression rate requirements of a service. Moreover, in the present exemplary embodiment, when a new RRH is installed, in step S208, the new RRH is registered to the SD-RRH controller 142 for the SD-RRH controller 142 to store the new RRH's profile including location, type of communication protocols, in a database of the SD-RRH controller 142.

Figure 5:
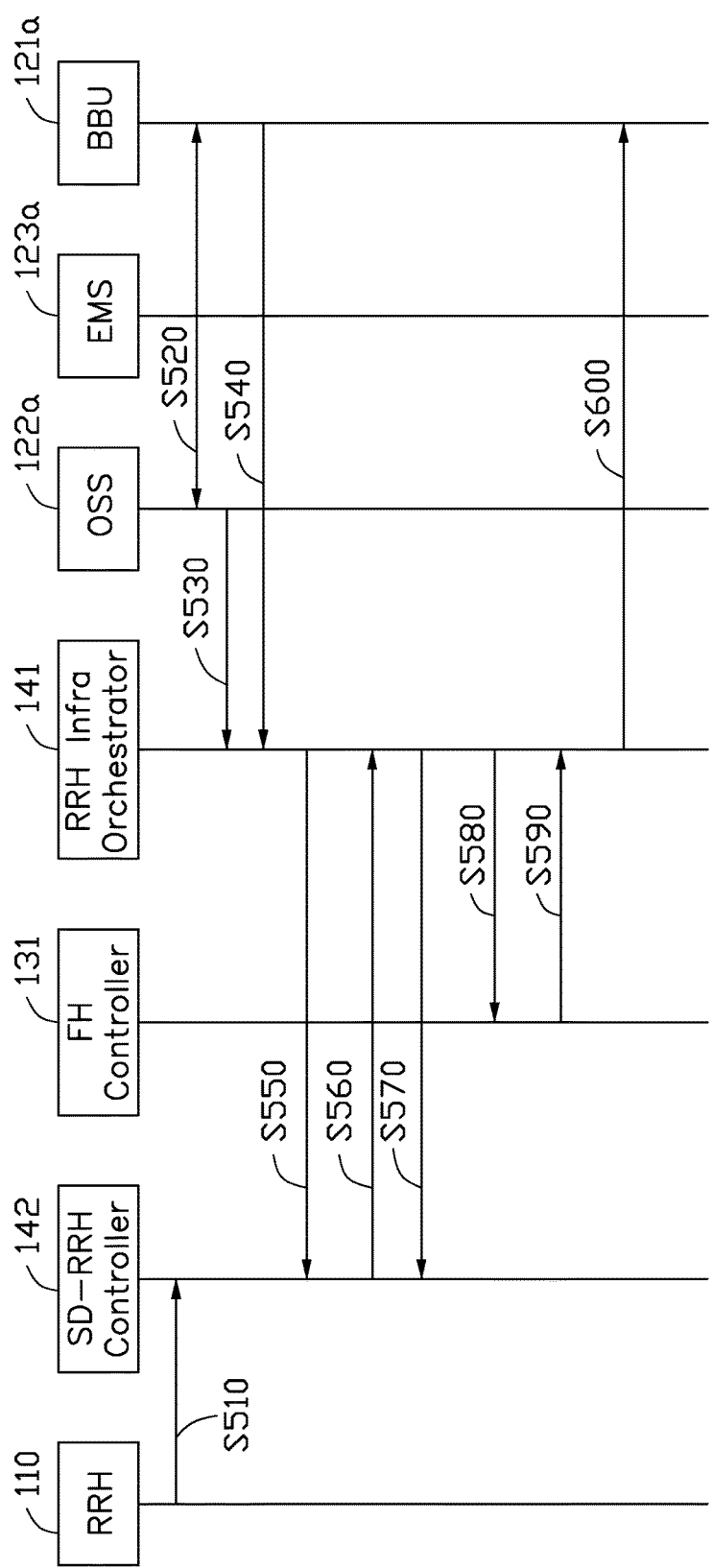
FIG. 5 is a schematic diagram of a method of resource allocation implemented in the wireless communication system of FIG. 3, in accordance with an exemplary embodiment of the present disclosure.

FIG. 5 is a schematic diagram of a method of resource allocation implemented in the wireless communication system of FIG. 3, in accordance with an exemplary embodiment of the present disclosure. In the present exemplary embodiment, in step S510, at least one RRH 110 is registered to the SD-RRH controller 142. Specifically, the SD-RRH controller 142 allocates the RRH resource by receiving an RRH profile of at least one RRH 110 in the RRH pool 11 from the at least one RRH 110, and generating the RRH allocation information accordingly. RRH profile may include an RRH ID, a link setup requirement, an RRH location, and an RRH MAC address. In one embodiment, RRH profile may also include a BBU location assigned by the at least one of the RRH 110. In step S520, the OSS 122a allocates the BBU resources to at least one BBU 121a through the EMS 123a. Specifically, the OSS 122a allocates the BBU resource by receiving a BBU profile of at least one BBU 121a in the BBU pool 12a from the at least one BBU 121a. In step S530, the OSS 122a generates the BBU allocation information accordingly in response to the BBU profile, and transmits the BBU allocation information to the RRH infrastructure orchestrator 141. The BBU profile may include a BBU ID, and a BBU location. The BBU allocation information may include the BBU ID, a link setup requirement, and the BBU location.

The link setup requirement, in the present exemplary embodiment, includes a radio access technology. In some embodiments, the link setup requirement includes bandwidth information. In some embodiments, the link setup requirement includes band information. In other embodiments, the link setup requirement includes multi-input multi-output information. In some other embodiments, the link setup requirement includes compression information. In yet other embodiments, the link setup requirement includes a communication protocol. In some embodiments, BBU allocation information includes an RRH location assigned by the OSS 122a or the BBU 121a.

In some embodiments, step S540 is performed after the BBU 121a received a BBU resource allocation request from the RRH infrastructure orchestrator 141 (not shown). In step S540, the RRH infrastructure orchestrator 141 receives BBU information from the BBU 121a through the EMS 123a and the OSS 122a. The RRH infrastructure orchestrator 141, in the present exemplary embodiment, stores the BBU information. In some embodiments, the BBU information includes BBU compression information. In some embodiments, the BBU information includes BBU address information. In step S550, the RRH infrastructure orchestrator 141 transmits the RRH resource allocation request to the SD-RRH controller 142. In the present exemplary embodiment, the RRH resource allocation request is generated in response to the BBU allocation information. In some embodiments, the resource allocation request includes the link setup requirement.

After the RRH resource allocation request is received by the SD-RRH controller 142, in step S560, the SD-RRH controller 142 generates and transmits the RRH allocation information to the RRH infrastructure orchestrator 141. In some embodiments, the RRH allocation information includes a virtual RRH ID. In some embodiments, the RRH allocation information includes a virtual RRH flowID. In some embodiments, the RRH allocation information includes a virtual MAC address. In step S570, the RRH infrastructure orchestrator 141 generates RRH configuration information in response to the RRH allocation information, and transmits the RRH configuration information to the SD-RRH controller 142. In some embodiments, the RRH configuration information includes the virtual RRH ID. In some embodiments, the RRH configuration information includes the virtual RRH flowID. In some embodiments, the RRH configuration information includes a BBU MAC address. In one embodiment, the BBU MAC address is stored in the RRH infrastructure orchestrator 141. In another embodiment, the BBU MAC address is obtained from the received BBU address information in the step 540.

In step S580, the RRH infrastructure orchestrator 141 transmits the FH resource allocation request to the FH controller 131. In some embodiments, the FH resource allocation request is generated in response to the BBU allocation information received from the OSS 122a. In some embodiments, the FH resource allocation request includes bandwidth information. In some embodiments, the FH resource allocation request includes latency information. In some embodiments, the FH resource allocation request includes jitter information. In other embodiments, the FH resource allocation request includes the BBU MAC address. In yet other embodiments, the FH resource allocation request includes the RRH MAC address. In some embodiments, in step S590, the FH controller 131 generates FH allocation information and transmits the FH allocation information to the RRH infrastructure orchestrator 141. In step S600, the RRH infrastructure orchestrator 141 assigns and transmits a RoE parameter to the BBU 121a of the BBU pool 12a. In some embodiments, the step S600 is performed after the step S560, when the RoE parameter includes RRH allocation information. In some other embodiments, the step S600 is performed after the step S590, when the RoE parameter includes FH allocation information. After the step S600 is performed, the data path including at least one RRH 110, the FH network 13 and BBU 121a is established by the RRH infrastructure orchestrator 141, in response to the RRH allocation information, the FH allocation information and the BBU allocation information.

Figure 6:
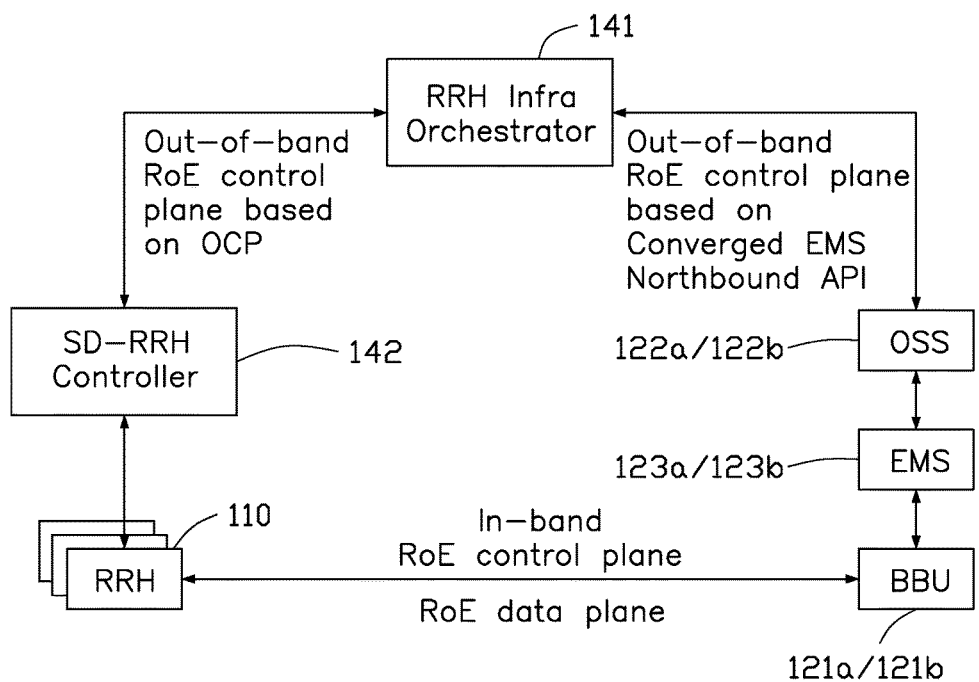
FIG. 6 is a schematic diagram of a RoE control mechanism for the radio access network of FIG. 3, in accordance with an exemplary embodiment of the present disclosure.

FIG. 6 is a schematic diagram of a Radio over Ethernet (RoE) control mechanism for the radio access network of FIG. 3, in accordance with an exemplary embodiment of the present disclosure. In the present exemplary embodiment, the SD-RRH Controller 142 is configured to allocate RRH resources in response to the RRH resource allocation request from the RRH infrastructure orchestrator 141. The SD-RRH Controller 142 is further configured to allocate BBU resource in response to the BBU resource allocation request from the RRH infrastructure orchestrator 141 via an out-ofband data path, before the RRHs 110 starts to communicate with the BBU via an in-band data path during a running-time. Moreover, when the RRH infrastructure is initializing the allocation of the RRHs 110, a BBU MAC address is then assigned, by the RRH infrastructure orchestrator 141, to the allocated RRH. Moreover, a flowID and the RRH MAC address are assigned to the BBU by the RRH infrastructure orchestrator 141.

Figure 7:
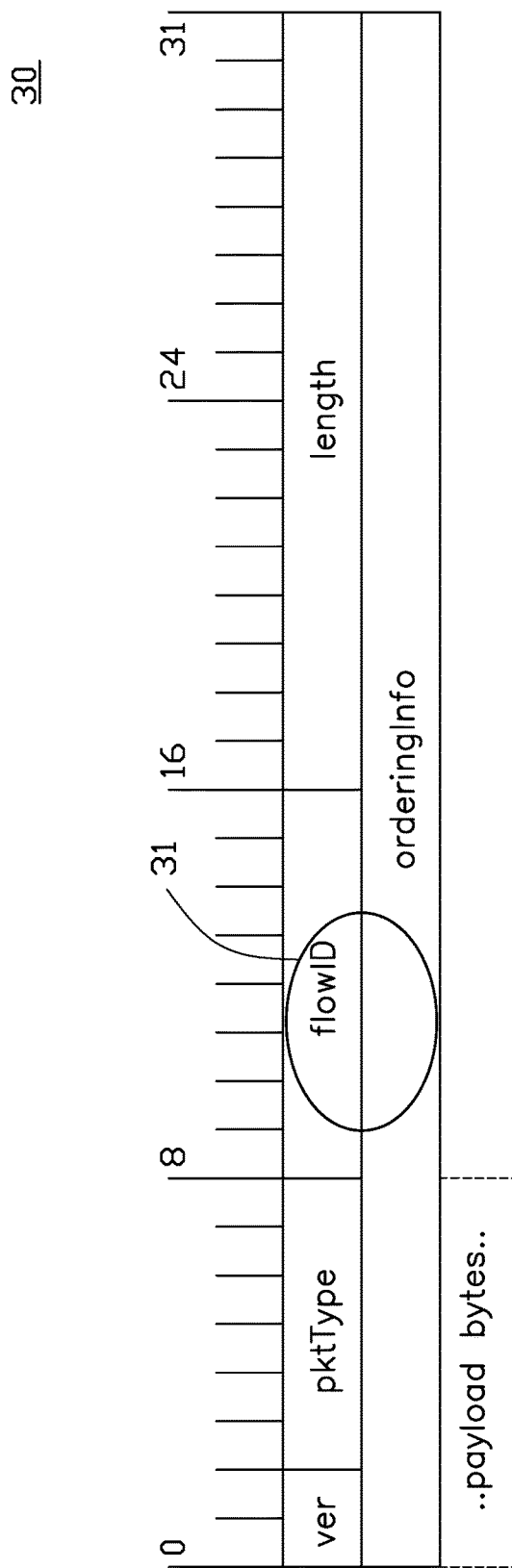
FIG. 7 is a schematic diagram of a header of a RoE common packet, in accordance with an exemplary embodiment of the present disclosure.

FIG. 7 is a schematic diagram of a header of a RoE common packet, in accordance with an exemplary embodiment of the present disclosure. In some embodiments, the RoE common packet carries radio IQ data between BBU and RRH over an Ethernet transmission. As shown in FIG. 7, in the present exemplary embodiment, a header 30 of a RoE common packet includes RoE parameters, such as supported versions (ver), packet type (pktType), flowID 31, length field (length), and ordering information (orderingInfo). In the present exemplary embodiment, the flowID 31 (in the header of the RoE common packet) and a Peer MAC Address (not shown) are mandatory parameters for RoE configuration for in-band control plane. In the present exemplary embodiment, the flowID 31 is used for multiplexing flows between source address and destination address (SA/DA) pair. The flowID 31 is assigned by the RRH controller via the out-of-band data path. The length field (length) may contain a value for the number of bytes in the payload (payload bytes) of the packet. The ordering information (orderingInfo) includes a sequence number.

In some embodiments, the RoE parameters include types of encryption. In some embodiments, the RoE parameters include bandwidth of the in-band data path. In some other embodiments, the RoE parameters includes compression algorithm of the in-band data path. In other embodiments, the RoE parameters include sample length of the in-band data path. In yet other embodiments, the RoE parameters include the number of samples per packet.

Figure 8:
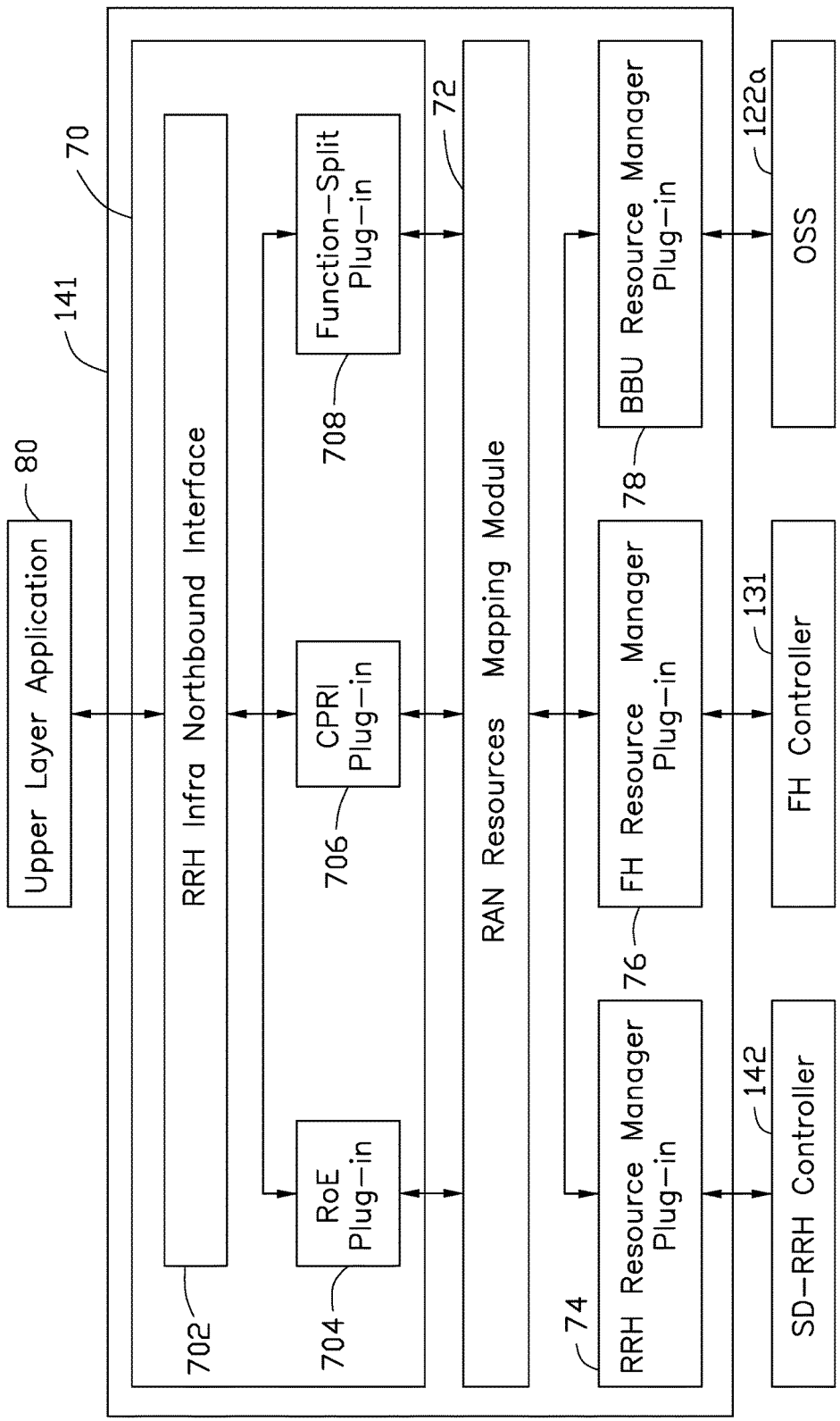
FIG. 8 is a block diagram of an infrastructure of the Remote Radio Head orchestrator of FIG. 3, in accordance with an exemplary embodiment of the present disclosure.

FIG. 8 is a block diagram of an infrastructure of the Remote Radio Head orchestrator of FIG. 3, in accordance with an exemplary embodiment of the present disclosure. The RRH infrastructure orchestrator 141 is configured for coordinating FH network resources, RRH resource and BBU resources to create an End-to-End link between RRH and BBU. As shown in FIG. 8, in the present exemplary embodiment, the RRH infrastructure orchestrator 141 includes a communication protocol selecting module 70, a RAN resources mapping module 72, an RRH resources managing plug-in module 74, an FH resources managing plug-in module 76 and a BBU resources managing plug-in module 78.

The communication protocol selecting module 70 is configured to receive a resource allocation instruction from a user equipment (e.g., request for processing upper layer application 80) and generate a RoE parameter accordingly. The RAN resources mapping module 72 is configured to provide APIs to manipulate RRH resource, FH network resource and BBU resource, and request RRH resource, FH network resource, and BBU resource in response to parameters from the communication protocol selecting module 70. The RAN resources mapping module 72 is further configured to generate and manage the topology between RRH and BBU resources. The RRH resources managing module 74 is configured to generate the RRH resource allocation request, and provide interface to SD-RRH controller 142 and the RAN resources mapping module 72. The FH resources managing module 76 is configured to generate the FH resource allocation request and provide interface to different FH controllers 131 for multi-layer/multi-domain, and provide a common interface to the RAN resources mapping module 72. The BBU resources managing module 78 is configured to generate the BBU resource allocation request, and provide interface to OSS 122*a* and the RAN resources mapping module 72.

In one embodiment, the communication protocol selecting module 70 further includes an RRH infrastructure northbound interface 702, at least two communication protocol modules (e.g. a RoE plug-in module 704, a common public radio interface (CPRI) plug-in module 706, and a function-split plug-in module 708). The RRH infrastructure northbound interface 702 is configured to provide a common restful API for upper layer application 80 to create an End-to-End link for mobile RAN.

The at least two communication protocol modules are configured to convert the request received from the user equipment (e.g., request for processing upper layer application 80) to specific parameters for the RAN resources mapping module 72.

In the present exemplary embodiment, the RRH infrastructure orchestrator 141 includes the communication protocol selecting module 70 which allows the orchestrator 141 to coordinate the resource allocation between RRH pool 11, the FH network 13, and BBU pool 12 with at least two communication protocols. In the present exemplary embodiment, the two communication protocols are RoE protocol and CPRI protocol.

Figure 9:
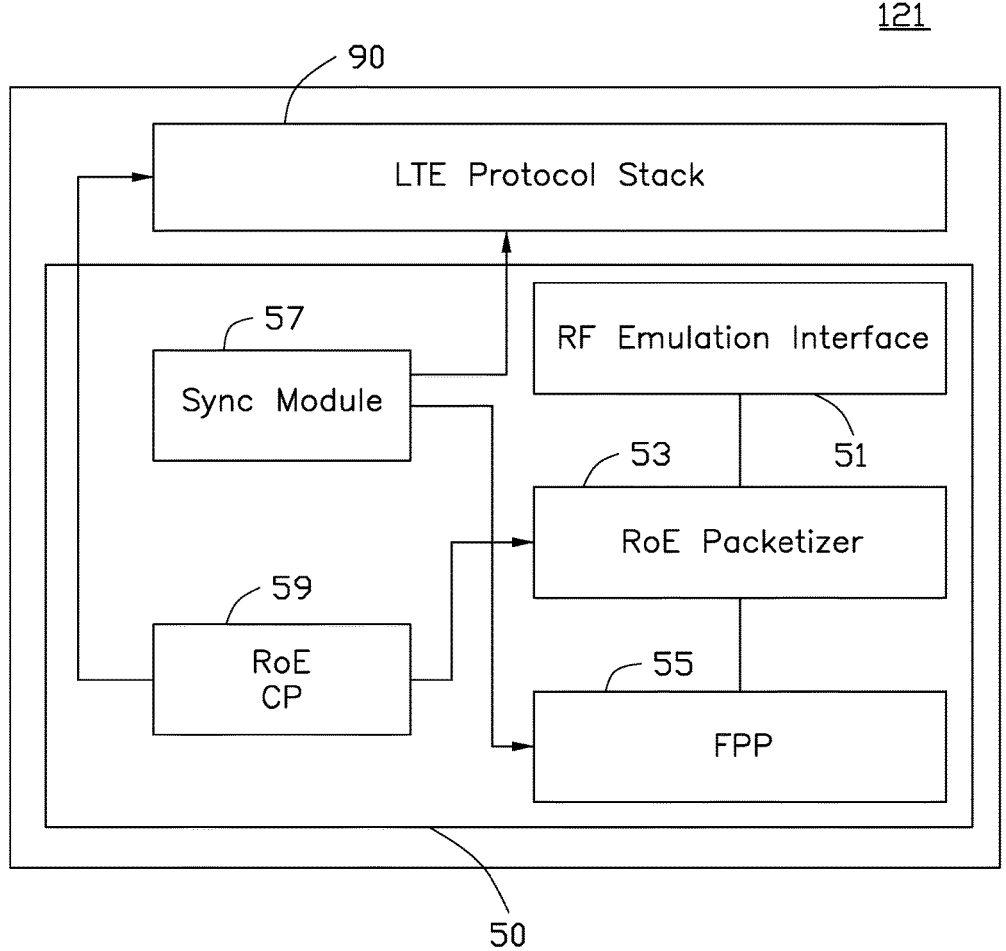
FIG. 9 is a block diagram of an infrastructure of the BBU of FIG. 1, in accordance with an exemplary embodiment of the present disclosure.

FIG. 9 is a block diagram of an infrastructure of BBU of FIG. 1, in accordance with an exemplary embodiment of the present disclosure. As shown in FIG. 9, in the present exemplary embodiment, the BBU 121 includes a radio transport agent control plane (RTA CP) 50. The RTA CP 50 includes an RF emulation interface 51, a RoE packetizing module 53, a fast packet processing (FPP) module 55, a synchronization module 57 and a RoE control plane 59. The RF emulation interface 51 is configured to provide a communication interface which is independent of upper layer protocols. The RoE packetizing module 53 is configured to process IQ data encapsulation and de-capsulation.

The fast packet processing module 55 is configured to enhance packet forwarding capability and adjust the timing of RoE packet to be transmitted. The fast packet processing module 55, in some embodiments, includes Intel Data Plane Development Kit (DPDK).

The synchronization module 57 is configured to provide transmission time interval (TTI) indicator to FPP module 55 and upper layer protocol, such us LTE upper layer protocol of LTE (LTE Protocol Stack 90).

The RoE control plane 59 is configured to perform a RoE out-of-band control plane between RRHs and BBUs. The RoE control plane 59, in some embodiments, applies configurations (e.g., RRH MAC address and flowID) to the RoE packetizing module 53. The RoE control plane 59 exchanges RoE parameters with the RRH infrastructure orchestrator 141. In some embodiments, the RoE parameters include BBU MAC addresses. In other embodiments, the RoE parameters include compression algorithm. In some other embodiments, the RoE parameters include bandwidth of the in-band data path. In yet other embodiments, the RoE parameters include the supported versions of RoE. Moreover, the RoE control plane 59, in some embodiments, retrieves operating information including BBU IDs. In other embodiments, the operating information include a transmission processing time from upper layers (e.g. LTE Protocol Stack 90).

Figure 10:
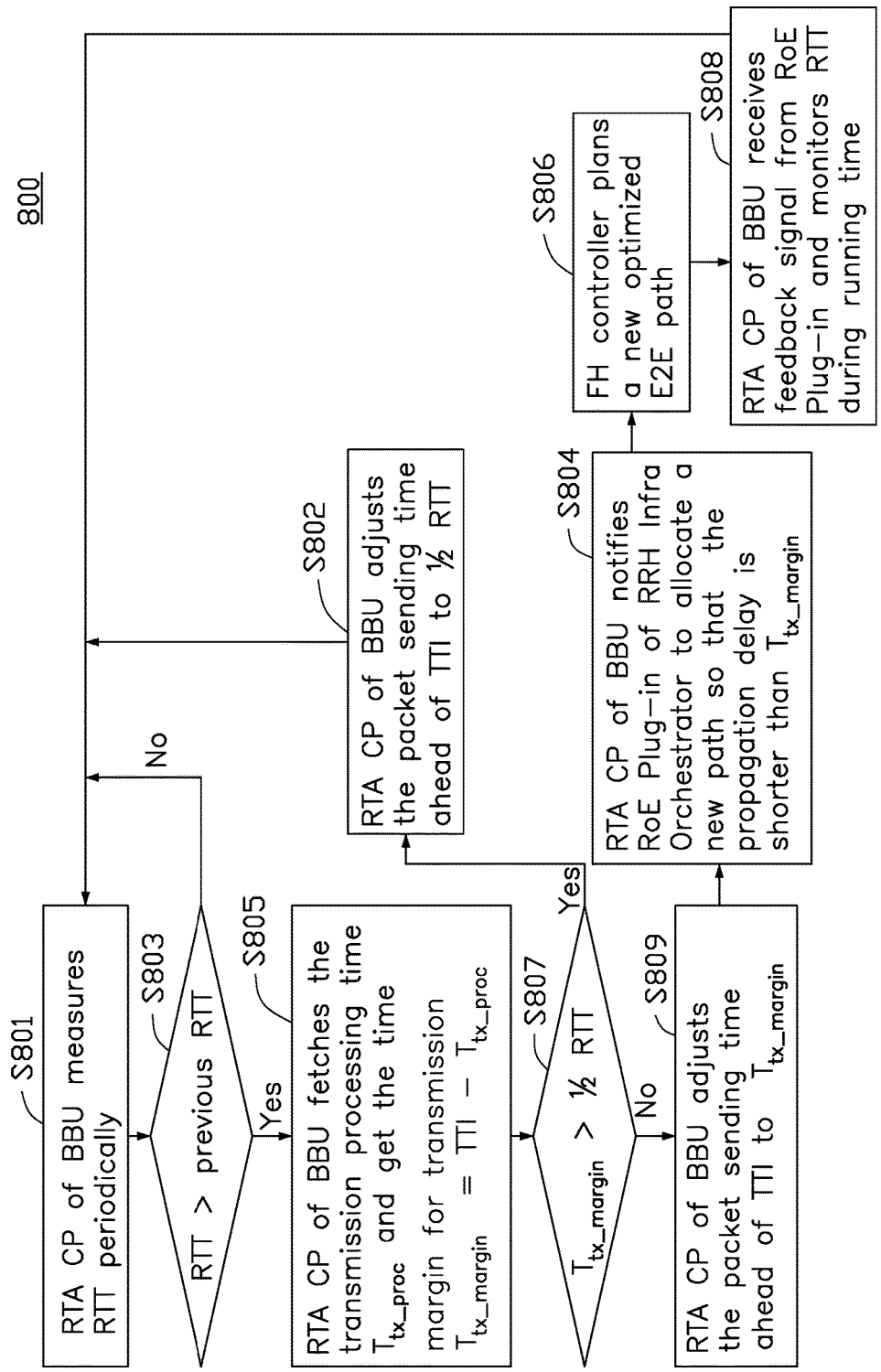
FIG. 10 is a flowchart of a method of a dynamic compensation mechanism of propagation delay of the RAN of FIG. 3, in accordance with an exemplary embodiment of the present disclosure.

FIG. 10 is a flowchart of a method of a dynamic compensation mechanism of propagation delay of the RAN of FIG. 3, in accordance with an exemplary embodiment of the present disclosure. Referring to FIG. 10, the example method 800 is provided by way of example only, as there are a variety of ways to carry out the method. The method 800, in some embodiments, is implemented with the configurations shown in FIG. 1, FIG. 3 and FIG. 9. Each block shown in FIG. 10 represents one or more processes, methods or subroutines. Furthermore, the order of blocks is illustrative only and the order of the blocks can change in response to the present disclosure. Additional steps can be added or fewer steps may be utilized, without departing from this disclosure.

In the present exemplary embodiment, BBUs and RRHs are time synchronized. The transmission processing time delay and reception processing time delay in FH network are symmetric. As shown in FIG. 10, in step S801, a radio transport agent control plane (e.g., RTA CP 50 in FIG. 9) of a BBU measures an RTT (Round Trip Time) between the BBU and the RRH periodically. In step S803, the RTA CP determines whether the measured RTT is greater than a previous measured RTT. When the measured RTT is greater than a previous measured RTT, step S805 is then performed. In step S805, the RTA CP fetches a transmission processing time $T_{tx\_proc}$ from the PHY layer. Therefore, a time margin $T_{tx\text{-}margin}$ for transmission is obtained via the following formula.

$$T_{tx\_margin} = TTI - T_{tx\_proc}.$$

The TTI represents the transmission time interval between the BBU and the RRH. When the measured RTT is less than or equal to the previous measured RTT, step S801 is then performed.

In step S807, the RTA CP determines whether the $T_{tx\_margin}$ is greater than a predetermined value, such as half of the measured RTT (½ RTT). When the $T_{tx\_margin}$ is greater than ½ RTT, step S802 is then performed. In step S802, a packet sending time is adjusted to ½ RTT ahead of TTI by the RTA CP. When the $T_{tx\_margin}$ is less than or equal to ½ RTT, step S809 is then performed.

In step S809, the packet sending time is adjusted to $T_{tx\_margin}$ ahead of TTI by the RTA CP, and step 804 is then performed. In step S804, the RTA CP of the BBU notifies a RoE plug-in module (e.g. 704 in FIG. 8) of RRH infrastructure orchestrator to allocate a new data path so that a propagation delay of the new data path is less than $T_{tx\_margin}$. In step S806, the FH controller configures a new optimized end-to-end path, and the propagation delay of the new optimized end-to-end path is less than $T_{tx\_margin}$.

In step S808, the RTA CP of the BBU receives a feedback signal from the RoE plug-in module of RRH infrastructure orchestrator, and monitors RTT during running time in response to the feedback signal. In the present exemplary embodiment, the feedback signal includes network compensation information. Therefore, in the present exemplary embodiment, a packet is sent, by BBU, ahead of each arrival of Transmission Time Interval (TTI) in order to compensate propagation delay caused by the FH network. Moreover, the propagation delay of the FH network is reduced due to a new path with shorter propagation delay being chosen.

According to above embodiments of the present disclosure, various kinds of devices, systems, and methods of the communication system having resources allocation mechanism are provided. An orchestrator is coupled to an FH network, an RRH pool, and a BBU pool, and the orchestrator is configured to establish a data path in response to RRH allocation information, FH allocation information and BBU allocation information. Therefore, the orchestrator may coordinate FH network resources, RRH resource and BBU resources at the same time so that the consuming time of a link setup may be reduced. Moreover, the orchestrator may establish a data path without bounding the RRH resources to specific MNO. Furthermore, the orchestrator may assign a new data path in response to the updated RRH allocation information when a new RRH is registered, or in response to the updated FH allocation information, or in response to the updated BBU allocation information, so that the flexibility of the control plane of the wireless communication is enhanced. On the other hand, different communication protocols may be supported in the present disclosure, and the link setup may be dynamically adjusted accordingly.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method of resource allocation implemented in a wireless communication system, the method comprising:
   receiving, by an orchestrator, at least one resource allocation instruction;
   generating, by the orchestrator, a remote radio head (RRH) resource allocation request, a fronthaul (FH) resource allocation request, and a baseband unit (BBU) resource allocation request, in response to the at least one resource allocation instruction;
   transmitting, by the orchestrator, the RRH resource allocation request to an RRH pool, the FH resource allocation request to an FH network, and the BBU resource allocation request to a BBU pool;
   allocating, by an RRH controller of the RRH pool, an RRH resource in response to the RRH resource allocation request and transmitting RRH allocation information of the allocated RRH resource to the orchestrator;
   allocating, by an FH controller of the FH network, an FH network resource in response to the FH resource allocation request and transmitting FH allocation information of the allocated FH network resource to the orchestrator;
   allocating, by a BBU controller of the BBU pool, a BBU resource in response to the BBU resource allocation request and transmitting BBU allocation information of the allocated BBU resource to the orchestrator; and
   establishing, by the orchestrator, a data path including at least one RRH in the RRH pool, the FH network and at least one BBU in the BBU pool, in response to the RRH allocation information, the FH allocation information and the BBU allocation information.

2. The method of claim 1, wherein the step of allocating the BBU resource further includes receiving, by the BBU controller, a BBU profile of one of the BBU in the BBU pool, wherein the BBU allocation information is generated in response to the BBU profile.

3. The method of claim 1, wherein the RRH resource allocation request is generated in response to the BBU allocation information received from the BBU controller, and the BBU allocation information includes a link setup requirement.

4. The method of claim 3, wherein the BBU allocation information further includes a BBU location.

5. The method of claim 3, wherein the BBU allocation information further includes an RRH location.

6. The method of claim 1, wherein the step of allocating the RRH resource further includes receiving, by the RRH controller, an RRH profile of an RRH in the RRH pool, wherein the RRH allocation information is generated in response to the RRH profile and the RRH resource allocation request.

7. The method of claim 1 further including transmitting, by the orchestrator, RRH configuration information to the RRH controller, wherein the RRH configuration information is generated, by the orchestrator, in response to the RRH allocation information.

8. The method of claim 1 further including transmitting, by the orchestrator, the RRH allocation information to the BBU controller.

9. The method of claim 1 further including receiving, by the orchestrator, BBU compression information from the BBU controller.

10. The method of claim 1 further including receiving, by the orchestrator, BBU address information from the BBU controller.

11. The method of claim 1 further including transmitting, by the orchestrator, the FH allocation information to the BBU controller.

12. The method of claim 1, wherein the step of allocating the BBU resource further includes steps of:
receiving, by the orchestrator, a path establishment request from the BBU controller;
generating, by the orchestrator, an FH resource allocation compensation request in response to the path establishment request;
transmitting, by the orchestrator, the FH resource allocation compensation request to the FH controller;
receiving, by the orchestrator, FH allocation compensation information generated by the FH controller in response to the FH resource allocation compensation request; and
transmitting, by the orchestrator, the FH allocation compensation information to the BBU controller.

13. A method of resource allocation implemented in an electronic equipment, the method comprising:
receiving, by an orchestrator of the electronic equipment, at least one resource allocation instruction;
generating, by the orchestrator, a remote radio head (RRH) resource allocation request, a fronthaul (FH) resource allocation request, and a baseband unit (BBU) resource allocation request in response to the at least one resource allocation instruction;
transmitting, by the orchestrator, the RRH resource allocation request to an RRH pool, the FH resource allocation request to an FH network and the BBU resource allocation request to a BBU pool;
receiving, by the orchestrator, RRH allocation information of an allocated RRH resource from an RRH controller of the RRH pool;
receiving, by the orchestrator, FH allocation information of an allocated FH network resource from an FH controller of the FH network;
receiving, by the orchestrator, BBU allocation information of an allocated BBU resource from a BBU controller of the BBU pool;
establishing, by the orchestrator, a data path including at least one RRH in the RRH pool, the FH network and at least one BBU in the BBU pool, in response to the RRH allocation information, the FH allocation information and the BBU allocation information.

14. The method of claim 13, wherein the RRH resource allocation request is generated in response to the BBU allocation information received from the BBU controller, and the BBU allocation information includes a link setup requirement.

15. The method of claim 14, wherein the BBU allocation information further includes a BBU location.

16. The method of claim 14, wherein the BBU allocation information further includes an RRH location.

17. The method of claim 13 further including transmitting, by the orchestrator, RRH configuration information to the RRH controller, wherein the RRH configuration information is generated, by the orchestrator, in response to the RRH allocation information.

18. The method of claim 13 further including transmitting, by the orchestrator, the RRH allocation information to the BBU controller.

19. The method of claim 13 further including receiving, by the orchestrator, BBU compression information from the BBU controller.

20. The method of claim 13 further including receiving, by the orchestrator, BBU address information from the BBU controller.

21. The method of claim 13 further including transmitting, by the orchestrator, the FH allocation information to the BBU controller.

22. The method of claim 13 further including steps of:
receiving, by the orchestrator, a path establishment request from the BBU controller;
generating, by the orchestrator, an FH resource allocation compensation request in response to the path establishment request;
transmitting, by the orchestrator, the FH resource allocation compensation request to the FH controller;
receiving, by the orchestrator, FH allocation compensation information generated by the FH controller in response to the FH resource allocation compensation request; and
transmitting, by the orchestrator, the FH allocation compensation information to the BBU controller.

23. An electronic equipment of a wireless communication system, comprising:
an orchestrator respectively coupled to a fronthaul (FH) network, a remote radio head (RRH) pool, and a baseband unit (BBU) pool, wherein the orchestrator is configured to establish a data path in response to RRH allocation information, FH allocation information and BBU allocation information, wherein the data path including at least one RRH in the RRH pool, the FH network and at least one BBU in the BBU pool;
wherein the orchestrator is configured to generate, in response to at least one resource allocation instruction, an RRH resource allocation request to the RRH pool, an FH resource allocation request to the FH network, and a BBU resource allocation request to the BBU pool.

24. The electronic equipment of claim 23, wherein the RRH allocation information is generated, by an RRH controller of the RRH pool, in response to an allocated RRH resource.

25. The electronic equipment of claim 23, wherein the FH allocation information is generated, by an FH controller of the FH network, in response to an allocated FH network resource.

26. The electronic equipment of claim 23, wherein the BBU allocation information is generated, by a BBU controller of the BBU pool, in response to an allocated BBU resource.

27. The electronic equipment of claim 23, wherein the RRH resource allocation request is generated in response to the BBU allocation information received from a BBU controller, wherein the BBU allocation information comprises a link setup requirement.

28. The electronic equipment of claim 27, wherein the BBU allocation information includes a BBU location.

29. The electronic equipment of claim 27, wherein the BBU allocation information includes an RRH location.

30. The electronic equipment of claim 23, wherein the orchestrator is further configured to transmit RRH configuration information to an RRH controller, wherein the RRH configuration information is generated by the orchestrator in response to the RRH allocation information.

31. The electronic equipment of claim 23, wherein the orchestrator is further configured to transmit the RRH allocation information to a BBU controller.

32. The electronic equipment of claim 23, wherein the orchestrator is further configured to receive BBU compression information from a BBU controller.

33. The electronic equipment of claim 23, wherein the orchestrator is further configured to receive BBU address information from a BBU controller.

34. The electronic equipment of claim 23, wherein the orchestrator is configured to transmit the FH allocation information to a BBU controller.

35. The electronic equipment of claim 23, wherein the orchestrator is further configured to:
receive a path establishment request from a BBU controller;
generate an FH resource allocation compensation request in response to the path establishment request;
transmit the FH resource allocation compensation request to an FH controller;
receive FH allocation compensation information generated by the FH controller in response to the FH resource allocation compensation request; and
transmit the FH allocation compensation information to the BBU controller.

36. The electronic equipment of claim 23, wherein the orchestrator comprises:
a communication protocol selecting unit configured to receive the at least one resource allocation instruction and generate a Radio over Ethernet (RoE) parameter in response to the at least one resource allocation instruction;
a radio access network (RAN) resources mapping unit configured to generate a BBU parameter, an RRH parameter and an FH parameter in response to the RoE parameter;
a BBU resource manager plug-in unit configured to generate the BBU resource allocation request in response to the BBU parameter and transmit the BBU resource allocation request to a BBU controller;
an RRH resource manager plug-in unit configured to generate the RRH resource allocation request in response to the RRH parameter and transmit the RRH resource allocation request to an RRH controller; and
an FH resource manager plug-in unit configured to generate the FH resource allocation request in response to the FH parameter and transmit the FH resource allocation request to an FH controller.

37. The electronic equipment of claim 23 further comprising:
an RRH controller of the RRH pool;
wherein the RRH controller is configured to receive an RRH profile from one of the RRH, receive an RRH resource allocation request from the orchestrator, generate the RRH allocation information in response to the RRH profile and the RRH resource allocation request, and transmit the RRH allocation information to the orchestrator.

38. A baseband unit (BBU) resource allocation system, comprising:
a BBU controller; and
a plurality of BBUs coupled to the BBU controller;
wherein the BBU controller is configured to:
receive a BBU resource allocation request from an electronic equipment, wherein the electronic equipment is respectively coupled to a fronthaul (FH) network and a remote radio head (RRH) pool;
allocate a BBU resource in response to the BBU resource allocation request; and
transmit BBU allocation information to the electronic equipment in response to the allocated BBU resource.

39. The BBU resource allocation system of claim 38, wherein the BBU controller is further configured to:
receive a BBU profile from the BBU, wherein the BBU allocation information is generated in response to the BBU profile.

40. The BBU resource allocation system of claim 38, wherein the BBU allocation information comprises a link setup requirement.

41. The BBU resource allocation system of claim 40, wherein the BBU allocation information further comprises a BBU location.

42. The BBU resource allocation system of claim 40, wherein the BBU allocation information further comprises an RRH location.

43. The BBU resource allocation system of claim 38, wherein the BBU controller is further configured to:
receive RRH allocation information from the electronic equipment, wherein the RRH allocation information is generated by an RRH controller of an RRH pool; and
transmit the RRH allocation information to at least one BBU.

44. The BBU resource allocation system of claim 38, wherein the BBU controller is further configured to:
receive BBU compression information from at least one BBU; and
transmit the BBU compression information to the electronic equipment.

45. The BBU resource allocation system of claim 38, wherein the BBU controller is further configured to:
receive BBU address information from at least one BBU; and
transmit the BBU address information to the electronic equipment.

46. The BBU resource allocation system of claim 38, wherein the BBU controller is further configured to receive FH allocation information from the electronic equipment, and the FH allocation information is generated by an FH controller coupled to the electronic equipment.

47. The BBU resource allocation system of claim 38, wherein each of the BBUs comprises a transport agent configured to adjust, in response to a transmission processing time of the BBU and a round trip time between the BBU and the RRH, a packet sending time.

48. The BBU resource allocation system of claim 47, wherein the transport agent is further configured to:
  transmit a path establishment request to the electronic equipment through the BBU controller; and
  receive FH allocation compensation information from the electronic equipment through the BBU controller, wherein the FH allocation compensation information is generated by an FH controller coupled to the electronic equipment.

49. The BBU resource allocation system according to claim 48, wherein the transport agent comprising:
  a communication interface;
  a packetizer coupled to the communication interface;
  a packet processing unit coupled to the packetizer, wherein the packet processing unit is configured to adjust the packet sending time;
  a synchronization unit coupled to the packet processing unit; and
  a control plane configured to configure the packetizer.

50. The BBU resource allocation system of claim 38, wherein the BBU controller including:
  an operation support system (OSS) device; and
  an element management system (EMS) device coupled between the OSS device and the BBUs.

\* \* \* \* \*